US005859151A

United States Patent [19]
Eckstein et al.

[11] Patent Number: 5,859,151
[45] Date of Patent: Jan. 12, 1999

[54] DEGRADABLE BLEND COMPOSITION

[75] Inventors: Yona Eckstein, Kent; William Robert Wilber, Avon Lake; Witoki Szydlowski, Akron, all of Ohio

[73] Assignee: The B. F. Goodrich Company, Richfield, Ohio

[21] Appl. No.: 31,422

[22] Filed: Feb. 26, 1998

Related U.S. Application Data

[63] Continuation of Ser. No. 685,113, Jul. 23, 1996, abandoned, which is a continuation of Ser. No. 263,303, Jun. 21, 1994, abandoned.

[51] Int. Cl.$^6$ .............................. C08F 20/00; B32B 3/26
[52] U.S. Cl. .............................. 525/440; 528/80; 528/83; 528/84; 528/85; 525/453; 525/455; 428/304.4
[58] Field of Search .................. 528/80, 83, 84, 528/85; 525/440, 453, 455; 428/304.4

[56] References Cited

U.S. PATENT DOCUMENTS

| | | |
|---|---|---|
| 3,007,887 | 11/1961 | Essig . |
| 3,970,715 | 7/1976 | Jarrett . |
| 4,002,171 | 1/1977 | Taft . |
| 4,011,871 | 3/1977 | Taft . |
| 4,062,172 | 12/1977 | Allen et al. . |
| 4,429,097 | 1/1984 | Chang et al. . |
| 4,469,728 | 9/1984 | Belz . |
| 4,589,880 | 5/1986 | Dunn et al. . |
| 4,613,543 | 9/1986 | Dabi . |
| 4,650,817 | 3/1987 | Allen et al. . |
| 4,695,484 | 9/1987 | Tanaka et al. . |
| 4,797,223 | 1/1989 | Amick et al. . |
| 4,824,640 | 4/1989 | Hildenbrand et al. . |
| 4,826,493 | 5/1989 | Martini et al. . |
| 4,868,024 | 9/1989 | Cross et al. . |
| 4,870,148 | 9/1989 | Belz et al. . |
| 4,880,592 | 11/1989 | Martini et al. . |
| 5,009,648 | 4/1991 | Aronoff et al. . |
| 5,015,711 | 5/1991 | Simonet et al. . |

(List continued on next page.)

FOREIGN PATENT DOCUMENTS

| | | |
|---|---|---|
| 0314156 | 10/1988 | European Pat. Off. . |
| 0388924 | 3/1990 | European Pat. Off. . |
| 0408503 | 1/1991 | European Pat. Off. . |
| 0514172 | 11/1992 | European Pat. Off. . |
| 0527447 | 2/1993 | European Pat. Off. . |
| 1254627 | 9/1993 | Japan . |
| 3011129 | 9/1993 | Japan . |
| 9010671 | 9/1990 | WIPO . |
| 03544 | 7/1993 | WIPO . |
| 9428055 | 12/1994 | WIPO . |

OTHER PUBLICATIONS

"We Develop Plastics That Dissolve If and When You Want Them To", Belland (1988).

"Water soluble Polymers, Preparation and Application", Master, BFGoodrich. No Date Available.

"Novon Debuts Two Degradable Resins Begins Building Plant", *Plastic News*, Jun. 1995.

"Water Soluble Bottles", Extrusion & Blow Molding Newsletter. vol. XVI, No. 19, May 11, 1992.

BFGoodrich, "Carboset® Resins", GC 73. No Date Available.

Technical Data Sheets for Carboset 525, 526, 527, 511 (1993).

(List continued on next page.)

*Primary Examiner*—Samuel A. Acquah
*Attorney, Agent, or Firm*—Samuel B. Laferty; Brian M. Kolkowski

[57] ABSTRACT

The present invention provides a blend composition comprising a thermoplastic polyurethane and an acrylic acid copolymer wherein the thermoplastic polyurethane forms the discontinuous phase of the blend. The blend can be used in films or made into fibers for personal care products such as ostomy bags and diapers. Moreover, such materials are also useful for packaging products such as garbage bags.

20 Claims, 4 Drawing Sheets

U.S. PATENT DOCUMENTS 5,063,272  11/1991  Sasse .
5,217,795   6/1993  Sasse .
5,254,607  10/1993  McBride et al. .
5,378,751   1/1995  Delbig et al. .

OTHER PUBLICATIONS

Several pages of a presentation believed to have been given in 1985 by Schollenberg on interpenetrating polymers and SEMS thereof.

"Truly Degradable Resins Are Now Truly Commercial", *Modern Plastics*, Feb. 1992.

Hawley's Condensed Chemical Dictionary, Twelfth Edition, p. 942 ©1993 by Van Nostrand Reinhold, New York, NY.

European Search Report EP 0 688 822 A3, completed Aug. 19, 1997.

English language Abstract for Japanese Publication No. JP503285, published on Sep. 2, 1993.

DEGRADABLE BLEND COMPOSITION

CROSS-REFERENCE

This is a continuation of application Ser. No. 08/685,113, filed on Jul. 23, 1996, now abandoned of Yona Eckstein et al., for NOVEL DEGRADABLE BLEND COMPOSITION, which is a file wrapper continuation of application Ser. No. 08/263,303, filed Jun. 21, 1994 now abandoned.

FIELD OF THE INVENTION

This invention relates to a polymer blend composition which is degradable in an alkaline solution. The blend comprises a thermoplastic polyurethane polymer and an acrylic acid copolymer.

BACKGROUND OF THE INVENTION

In this time of environmental awareness, there is a need for materials which are easily degradable for various uses including personal care products or for packaging products. Many times, these products are made from polyolefins such as polyethylene or polypropylene which are not considered as degradable plastic.

Starch has been blended with various plastics to form blends that are partly degradable. For example, European Patent Application No. 388,924 discloses a degradable film comprising a starch blended various polymers such as polyethylene, polyurethane, nylon, polyester and polyvinyl chloride.

As an alternative to blending starch to plastics, copolymers of (meth)acrylate esters and (meth)acrylic acid copolymers were blended with plastics such as polyolefins and modified polyolefins to provide for polymer compositions which are degradable in alkaline solutions. For example, U.S. Pat. No. 5,063,272 discloses a blend of a (meth)acrylic ester/(meth)acrylic acid copolymer and polyethylene glycol which is soluble in alkaline solutions. The relative proportions of the (meth)acrylic ether/(meth)acrylic acid copolymer and the polyethylene glycol depend upon the desired properties of the end product. This polymer blend provides polymeric webs having improved properties suitable for use in personal care products.

U.S. Pat. No. 5,217,795 discloses blends of (meth)acrylic ester/(meth)acrylic acid and modified polyolefins. In addition, these blends can be prepared using styrene/butadiene block copolymers and polyether block amide copolymers. The blends are formed into webs or films. These webs can then be used in absorbent articles.

It has now been discovered that precise, controllable water degradable blend compositions can be formed from blends of polyurethanes and acrylic acid copolymers.

SUMMARY OF THE INVENTION

The present invention provides a blend composition which can be degraded at a controlled rate in an alkaline solution having a pH of at least 8 comprising a heterogeneous blend of thermoplastic polyurethane and acrylic acid copolymer wherein the polyurethane component forms the discontinuous dispersed phase.

The present invention also comprises an article made from the blend which can be degraded.

DETAILED DESCRIPTION OF THE INVENTION

The present invention provides a novel degradable blend composition that comprises a thermoplastic polyurethane and an acrylic acid copolymer wherein the thermoplastic polyurethane forms the discontinuous dispersed phase of the blend. For purposes of this invention, a blend is degradable if it loses its integrity and breaks apart into small particles upon its introduction to an alkaline solution having a pH of at least 8.

Suitable polyurethanes for use in this invention are prepared by reacting a polyisocyanate and one or more chain extenders with an intermediate such as a hydroxyl terminated polyester, a hydroxyl terminated polycaprolactone, a hydroxyl terminated polycarbonate (i.e., a polycarbonate polyol), hydroxyl terminated polyester or mixtures thereof, or amine terminated polyesters, or polycarbonates, or polyesters, or mixtures thereof may be used.

A preferred class of hydroxyl terminated polyester intermediates is generally a linear polyester having a molecular weight of from about 500 to about 10,000, desirably from about 700 to about 5,000, and preferably from about 700 to about 4,200, and an acid number generally less than 0.8 and preferably less than 0.5. The molecular weight is determined by assay of the hydroxyl groups. The polyester intermediates are produced by (1) an esterification reaction of one or more glycols with one or more dicarboxylic acids or anhydrides, or (2) by an transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups.

The dicarboxylic acids used to form the polyurethane can be aliphatic, cycloaliphatic, aromatic, or combinations thereof. Suitable dicarboxylic acids which may be used alone or in mixtures usually have a total of from 4 to 15 carbon atoms and include: succinic, glutaric, adipic, pimelic, suberic, azelaic, sebacic, dodecanoic, terephthalic, and the like. Anhydrides of the above dicarboxylic acids, such as phthalic anhydride, tetrahydrophthalic anhydride, or the like, can also be utilized. Adipic acid is the preferred dicarboxylic acid used.

The ester-forming glycols can be aliphatic, aromatic, or combinations thereof having a total of from 2 to 12 carbon atoms. Examples of ester-forming glycols include: ethylene glycol, 1,4-butanediol, 1,5-pentanediol, 1,6-hexanediol, decamethylene glycol, dodecamethylene glycol and the like. 1,6-hexanediol is the preferred glycol.

In addition to the above polyester intermediates, numerous other types of polyester intermediates known to the art and to the literatures can be utilized including those having different molecular weights and/or contain branch polyesters therein. For example, polycaprolactone diols can be used. These are known polyester reaction products of lactones and bifunctional compounds having two reactive sites capable of opening the lactone ring. These bifunctional materials may be represented by the formula HX—R—XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials preferably include diols, diamines and aminoalcohols. Useful diols include alkylene glycols wherein the alkylene groups contains 2 to 10 carbon atoms. Examples of these diols include: ethylene glycol; 1,2-propane diol; 1-4 butanediol; 1-6 hexamethylene diol and the like. Ethylene glycol provides excellent polyesters.

The lactones preferred for preparing the polyesters are epsilon-caprolactones having the general formula wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethyl-epsilon-caprolactone, "γ" methyl-epsilon-caprolactone, "β"-methyl-epsilon-caprolactone, dimethyl-epsilon-caprolactone and the like. The lactones are polymerized readily by heating with the bifunctional reactant to a temperature of about 100° to about 200° C. Such polycaprolactone polyols are described in U.S. Pat. No. 3,660,357 which is hereby fully incorporated by reference.

The preferred hydroxyl terminated polyether has the formula:

wherein n is a number of from 2 to 6, and x is an integer greater than 7, such that the molecular weight is from about 500 to about 4,000. The preferred hydroxyl terminated polyether is hydroxyl poly(tetramethylene oxide) having a molecular weight from about 900 to 3,000.

The intermediate, such as a hydroxyl terminated polyester, is further reacted with one or more polyisocyanates and preferably a diisocyanate along with a chain extender, desirably in a "one-shot" process, that is, a simultaneous co-reaction of the intermediate, diisocyanate, and chain extender, to produce a moderate molecular weight linear polyurethane. The equivalent amount of diisocyanates to the total amount of hydroxyl and/or amine-containing components, that is, the hydroxyl or amine terminated polyester, and chain extender glycol, is desirably from about 0.98 to about 1.06; and preferably from about 0.99 to about 1.03.

In the one-shot polymerization process, a simultaneous reaction occurs between three components: one or more polyols, the diisocyanates, and a chain extender. The reaction is generally initiated at temperatures about 100° C. and desirably above 120° C. Inasmuch as the reaction is exothermic, the reaction temperature generally increases to about 200° C. to 280° C. Similar reaction temperatures are utilized when the polyurethane is made in a two-step process utilizing a prepolymer.

Alternatively, the polyurethane can be made in a conventional two-step process wherein initially a prepolymer is made from the polyisocyanate and an intermediate. The prepolymer subsequently is reacted with the chain extender glycol. The equivalent ratio of the one or more diisocyanates to the hydroxyl or amine terminated intermediate is generally a sufficient amount such that upon subsequent chain extension with a suitable glycol, the overall equivalent ratio of the hydroxyl or amine terminated compounds to the one or more polyisocyanates is approximately 0.95 to about 1.06, and the like. Often the overall equivalent ratio can be an excess such as up to about 1.20 or less, or 1.15 or less. Suitable diisocyanates include non-hindered aromatic diisocyanates such as: 4,4'-methylenebis-(phenyl isocyanate) (MDI); as well as non-hindered cyclic aliphatic diisocyanates such as 1,4-cyclohexyl diisocyanates (CHDI), decane-1,10-diisocyanate, phenylene-1,4-diisocyanate, naphthylene-1,5-diisocyanate, diphenylmethane-3,3'-dimethoxy-4,4'-diisocyanate, and cyclohexyl-1,4-diisocyanate, as well as combinations thereof. The most preferred non-hindered aromatic diisocyanate is 4,4'-methylenebis-(phenyl isocyanate), i.e., MDI.

Suitable chain extenders are saturated low molecular weight glycols, preferably aliphatic glycols. In particular, alkylene glycols containing from 2 to about 12 carbon atoms are useful chain extenders. Normally these glycols do not have molecular weights over about 300. Representative glycols include ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl) ether, diethylene glycol, as well as cycloaliphatic and aromatic glycols, and combinations thereof. 1,6-hexanediol is the preferred glycol.

Examples of the above, as well as other suitable thermoplastic polyurethanes which can be utilized, are set forth in Vol. 13 of the *Encyclopedia of Polymer Science and Engineering*, John Wiley & Sons, Inc., New York, N.Y., 1988, pages 243–303, which is hereby fully incorporated by reference. The preferred polyurethanes are polyester based polyurethanes, having a weight average molecular weight in the range of 150,000 to 400,000. Examples of suitable thermoplastic polyurethanes include the following polyurethanes commercially available from The B.F. Goodrich Company under the trademark "Estane": 58661, 58238, 58271, 58630, 5767. The most preferred polyurethane is Estane® 58238 polyurethane.

The formed polyurethane can be blended with various additives such as, for example, antioxidants, stabilizers, lubricants, process aids and fillers. Most preferably, the polyurethane is blended with 0 to 5 weight percent of a lubricant package. Any compatible or appropriate lubricant package giving the desired characteristics can be used. Suitable examples include fatty bisamide or fatty esters.

The acrylic acid copolymer to be blended with the thermoplastic polyurethane can be any acrylic acid copolymer having at least four (4) weight percent carboxyl functionality. The specific acrylic acid copolymer chosen depends upon the desired degradation rate of the blend. Moreover, the final processing of the blend may play some role into the choice of the acrylic acid copolymer. For example, the selection of a low molecular weight acrylic acid copolymer such as for example, but not limited to, Carboset® XL-27 Resin would not lead to a blend which could be easily extruded into a thin film due to the insufficient melt strength of the blend despite the fact that the blend blown into a 3 mil film could degrade within 5 to 10 minutes in an alkaline solution having a pH of 10.5. On the other hand, a high molecular weight acrylic acid copolymer such as Carboset® 526 Resin would yield a blend that may be readily processed by extrusion but would have a long degradation rate ranging approximately one month for a 3 mil blown film.

The preferred acrylic acid copolymer is a solid thermoplastic acrylic acid copolymer. Generally, any thermoplastic acrylic acid copolymer having a weight average molecular weight in the range of 100,000 to about 300,000 and at least four (4) weight percent carboxyl functionality could be used to form the blend. Suitable acrylic acid copolymers include Acrysol W.S. resins available from Rohm and Haas, Joncryl resins available from S. C. Johnson and water soluble acrylics from Lawton Chemical, "Neocryl" Resins from Polyvinyl Chemical (division of ICI), Staley Chemical, Reichold and American Cyanamid. In addition, the acrylic acid copolymers described in U.S. Pat. Nos. 4,870,148; 5,063,272 and European Patent Application No. 0314156A2 incorporated herein by reference, could be used in this invention. The following are preferred acrylic acid copolymers: Carboset® XPD 1330, Carboset® 525 and Carboset® 526 Resins, all of which are commercially available from The BFGoodrich Company. When the desired degradation rate is less than 60 minutes in an alkaline media, the most preferred acrylic acid copolymer is Carboset® XPD 1330.

The solid formed polyurethane and the solid acrylic acid copolymer in the desired weight ratio and viscosity ratio are mixed by any method or blended. Generally, any mixing or melt blending method commonly used for compounding thermoplastic polymers under conditions of heat and low shear can be used. Preferably the two components are melt blended in a single screw or twin screw extruder. Examples of a suitable extruders include Brabender® twin screw extruders, Warner Pfleiderer or twin screw extruders and Kilion single screw extruders.

In a typical blending process the thermoplastic polyurethane is mixed with the acrylic acid copolymer. The mixture is extruded in a single screw extruder at a melt temperature of approximately 180°–210° C. Alternatively, the mixing can be done by the addition of the lower melting acrylic acid copolymer to a melt of the higher melting thermoplastic polyurethane. The blend compound can then be size reduced by any suitable equipment into pellets, granules or cubes.

These pellets, granules or cubes can be made into films or webs. For example, conventional film dies and extruders or injection molding machines can be used. This equipment is not part of the invention, however, it is within the purview of one of ordinary skill in the art. However, during the processing of the pellets, granules, or cubes into films, the blend should be processed in such a manner to avoid substantial additional mixing of the polymers, in particular high sheer mixing. High sheer mixing could possibly cause the degradation of the molecular weight of the blend and thus decrease the viscosity of the thermoplastic polyurethane, and consequently affect the morphology of the blend. Preferably a single screw extruder designed for material transport but not material mixing, can be used to form the blend into a film.

The key to this invention is establishing a heterogeneous blend of two incompatible polymers in the course of forming an article from the blend so that the acrylic acid copolymer constitutes a continuous matrix phase, whereas thermoplastic polyurethane is in the form of a discontinuous, dispersed phase.

Controlled degradation is obtained by ensuring that the thermoplastic polyurethane forms the discontinuous phase in the blend. This can be obtained by controlling: 1) the blend morphology wherein the relative weight ratio of the two ingredients are varied, 2) the viscosity ratio of the thermoplastic polyurethane to that of the acrylic acid copolymer and 3) the process that is used to make the final desired article.

The weight ratio of the thermoplastic polyurethane to the acrylic acid copolymer controls the particle size of the thermoplastic polyurethane dispersed phase and the distance between the particles. Generally, the lower the concentration of the thermoplastic polyurethane in the dispersed phase, the larger the distance between the dispersed particles and the faster the degradation rate in alkaline medium.

The viscosity ratio of thermoplastic polyurethane to acrylic acid copolymer determines the shape of the polyurethane dispersed particles established in the blend after melt cooling. Melt cooling generally occurs after melt compounding or the final processing of the article. Generally, the melt index of each component of the blend can be used to calculate the viscosity ratio due to the fact that there is a functional dependence between the reciprocal of the melt index and the melt viscosity. The higher the viscosity ratio, the rounder the dispersed thermoplastic polyurethane particles and the faster degradation of an article made from the blend. When the dispersed particles are highly elongated, as may occur at a low viscosity ratio, a network of polyurethane fibers or lamina may form. Such a network will delay the degradation of an article made from the blend in an alkaline medium.

In addition, the viscosity ratio determines the relative weight ratio of the two polymers that is conducive to formation of co-continuous phases of the polymers in the blend. Co-continuous phase morphology slows the degradation of an article made from such a blend. Generally the viscosity ratio, the lower the concentration of polyurethane required for establishing co-continuous phases.

The thermoplastic polyurethane should be present in generally less than about 46 weight percent of the mixture. Preferably, the thermoplastic polyurethane should be present in more than about 5 weight percent and less than 46 percent of the mixture. Most preferably, the thermoplastic polyurethane should comprise 10 to 40 weight percent of the blend.

When the thermoplastic polyurethane comprises less than 20 weight percent of the blend, it is believed the degradation rate depends solely upon the solubility of the acrylic acid copolymer and is independent of the thermoplastic polyurethane concentrations. When the concentration of the thermoplastic polyurethane in the blend ranges from 20 to 46 weight percent, the degradation rate is controlled by the shape of the polyurethane particles. The shape of the particles is determined by the melt viscosity ratio and the amount of stretching that the blend is subjected to in its processing to form an article.

The acrylic acid copolymer should be present in more than about 54 weight percent and less than 95 weight percent of the mixture with 60 to 80 percent being preferred. As the two blend ingredients are incompatible (i.e. they are not mutually miscible in the melt form) a compatibilizer may be used to influence the particle size of the dispersed phase thermoplastic polyurethane particles and/or improve the adhesion between the phases. Only those compatibilizers which do not affect the blend heterogeneity, required by this invention, can be used. These compatibilizers are well within the scope of one of ordinary skill in the art. For example, monomeric or polymeric glycols such as glycerol, polyethylene glycol or polycaprolactone could be used. The compatibilizer could be added in about 1 to 30 weight percent of the discontinuous phase.

Generally, in order for the blend blown into a 3 mil film to degrade within one hour in an alkaline solution having a pH of 10.5, the viscosity ratio of the thermoplastic polyurethane to the acrylic acid as expressed by the ratio of the reciprocal melt index of the respective ingredients should be in the range of at least 6.0 to 7.0. If the desired degradation of a blown film is to occur in less than ten minutes in an alkaline solution, then the viscosity ratio should be greater than 16. While these ratios generally apply to articles that are either compression molded or extruded, the time required for degradation will generally be shorter for compression molded articles compared to extruded articles.

Fillers and other additives can be introduced into the composition provided only that they are not in kind or in an amount which would interfere with the formation of the discontinuous dispersed phase or with the desired or required properties of the composition. The amount and type of fillers and additives which can be used are easily determined by one of ordinary skill in the art.

Figure 1:
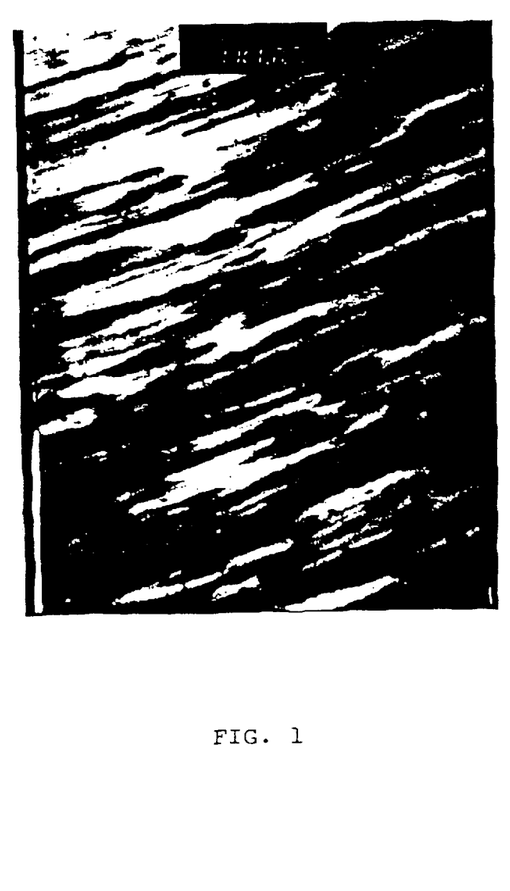
FIG. 1 is a photomicrograph produced by a scanning electron microscope ("SEM") at 3.81K magnification of a blend formed according to the instant invention and blown into film having a viscosity ratio of the thermoplastic polyurethane to acrylic acid in the blend of 2.7.
Figure 2:
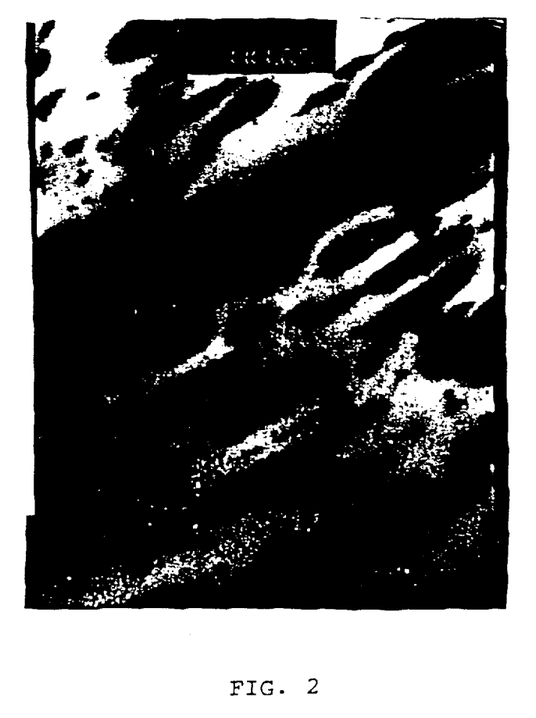
FIG. 2 is a photomicrograph produced by a SEM at 3.81K. magnification of a blend formed according to the instant invention and blown into a film having a viscosity ratio of the thermoplastic polyurethane to acrylic acid in the blend of 72.8.
Figure 3:
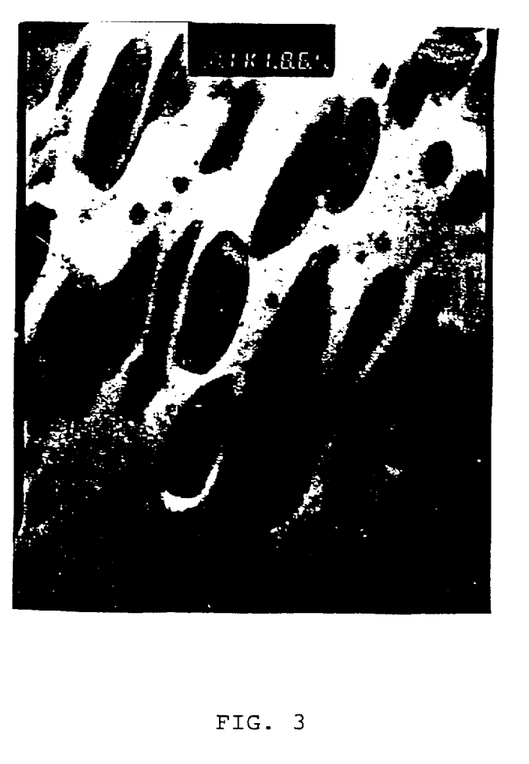
FIG. 3 is a photomicrograph produced by a SEM at 3.81K magnification of a blend formed according to the instant invention having a viscosity ratio of the thermoplastic polyurethane to acrylic acid in the blend of 2.7 which has been compression molded.
Figure 4:
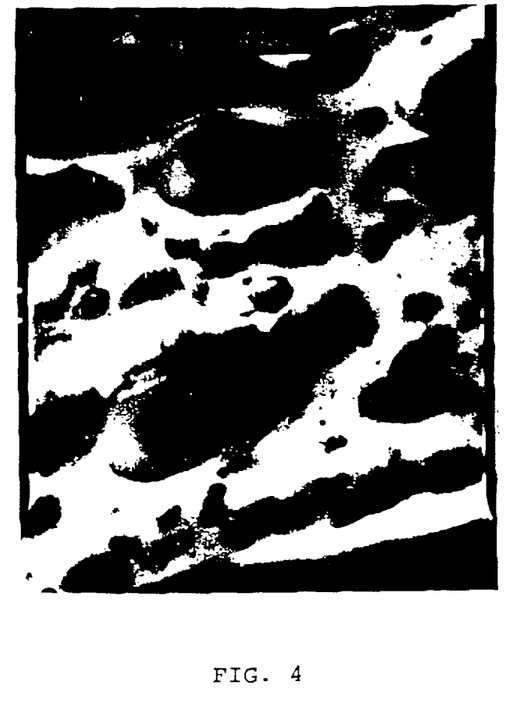
FIG. 4 is a photomicrograph produced by a SEM at 3.81K magnification of a blend formed according to the instant invention having a viscosity ratio of the thermoplastic polyurethane to acrylic acid in the blend of 72.8 which has been compression molded.

Depending on the viscosity ratio of thermoplastic polyurethane and acrylic acid copolymer, it is believed that the thermoplastic polyurethane which comprises the dispersed phase in order to obtain controlled degradation may be present as round or elongated drops or as highly elongated laminae embedded in the continuous matrix of the acrylic acid copolymer. The final shape of the particles depends on the viscosity ratio and the amount of stretching the melt is subjected to in the course of melt processing into film article. Stretching of the melt occurs, for example, by squeezing the melt between rollers, pressing between platens or extruding through a die or a combination of the devices. Compression molding involves less melt deformation than forming a film by extrusion. Examination of cross sectional areas of blown films made from the blend by scanning electron microscope (SEM) verify this observation. The SEMs of FIGS. 1–4 show the morphology of various blends formed according to this invention. The thermoplastic polyurethane/acrylic acid blend at a low viscosity ratio can be seen in FIGS. 1 and 3 and blend at a high viscosity ratio can be seen in FIGS. 2 and 4. FIG. 1 shows lamellar morphology obtained from a blend formed into a film having a low viscosity ratio. FIG. 2 shows the elongated drops obtained when a blend having a high viscosity ratio is formed into a film. Elongated drops can be seen in FIGS. 3 and 4 showing two different blends, one having a low viscosity ratio and the other having a high viscosity ratio, which were processed by compression molding.

It is believed that the lamellar morphology results from the high deformation of the low viscosity thermoplastic polyurethane drops in the direction of the extensional flow field. Eventually the lamellae coalesce and form a continuous thermoplastic polyurethane network. It is believed that the lamellae act as a barrier for diffusion of the alkali ions, into the acrylic acid copolymer matrix. Consequently, the rate of dissolution of the acrylic acid copolymer matrix at a low viscosity ratio blends will be delayed, and the overall degradation rate of the whole film reduced. Such a morphology is the preferred if degradation rate in alkali solution of longer than 24 hours is required.

At high viscosity ratio blends, the deformation of the thermoplastic polyurethane drops becomes more difficult and the resulting morphology of the thermoplastic polyurethane is that of medium to highly elongated drops. It is believed that such a morphology is the preferred embodiment of the blend, if a degradation rate of less than 60 minutes is desired, as it allows for uninhibited diffusion of the alkali solution into the acrylic acid matrix and the fast dissolution of the blend. Such a morphology is conducive for fast disintegration as it allows for uninhibited diffusion of the water or alkali ion from the alkaline solution into the acrylic acid matrix. As the acrylic acid copolymer matrix dissolves (in the absence of a continuous, alkali resistant, thermoplastic polyurethane network), the film looses its integrity and disintegrates into small particles.

The particle size of the thermoplastic polyurethane in the dispersed phase is selected with a view toward the size of this phase after melt stretching to form a film or an article. After melt stretching, the size of the dispersed phase is determined by:

a) the particle size of the dispersed thermoplastic polyurethane phase as established in the blend after initial melt mixing of the blend components;

b) the degree of stretching in the course of the film forming step.

After melt mixing, the particle size of the dispersed phase thermoplastic polyurethane component can be from about 0.25 micrometer up to about 15.0 micrometers. The particle size of the dispersed phase after stretching is about 0.1–0.5 micrometers thick lamellae in the case of low viscosity ratio ranging from about 1.5 to 10 and elongated drops, 0.5–20 micrometers long and 0.3 to 4.0 micrometers wide, in the case of viscosity ratios greater than 20.

The blend can be used to form any article which is to be degraded. The blend can be formed into a film by any film forming methods, for example, compression molding, thermoforming, cast strip extrusion, blown film extrusion, melt coating, injection molding or any other process which involves irreversible stretching of the thermoplastic polyurethane phase. This film can then be used in personal care products such as diapers, feminine pads, incontinence garments and ostomy bag. In addition, the blend can be formed into webs. Moreover, the blends may be used in packaging products such as films for plastic bags and the like.

The following non-limiting examples serve to illustrate the present invention in further detail.

EXAMPLES

A physical blend formed in accordance with this invention was fed into the feeder zone of a Brabender 1.25 inch twin screw extruder, and melt blended. Extruder zones were set with the following temperature profile: close to the feed zone 170° C., middle zones 175° C. and die 180° C. The blend was then stranded and pelletized.

The pellets were used to prepare thin films by compression molding or they were melt blown using an extruder. 3 mil thick compression molded plaques were obtained using a Pasadena Hydraulic Press at 350° F. and a pressure of 40,000 psi on a 4 inch ram. The melt blown film was obtained using Kilion one inch single screw extruder.

The films were then tested for degradation in alkaline solutions. All alkaline solutions were prepared diluting concentrated ammonia solution (27–29 wt % ammonia) with deionized water. The pH of the solutions was determined with a precalibrated Fisher Scientific pH meter.

A film sample having area of about 1 square inch was placed into 50 milliliters of a stirred alkaline solution. A timer was activated at the moment of contact between the film and solution. The time required for total degradation ("Degradation Rate") was defined as time at which the film lost its integrity and appeared as small particles.

In the case of film samples composed of acrylic acid copolymers alone, the solution remained clear throughout the dissolution process.

EXAMPLE 1

In this example, the effect of the type of acrylic acid copolymers were studied. For this example, Carboset Resins 525, 526, XL-27, XPD-1330 were used. The acrylic acid copolymers were melt blended with a polyurethane sold by The B. F. Goodrich Company as Estane® 58238 Polyurethane (TPU) in the proportions shown below in Table 1. The blends were blown into film having a thickness of 2.5–3 mils, and tested for degradation in alkaline solutions having a pH of 10.6.

TABLE 1

|  | Experiment No. | | | | | | | |
| --- | --- | --- | --- | --- | --- | --- | --- | --- |
|  | 1 | 2 | 3 | 4 | 5 | 6 | 7 | 8 |
| Estane ® 58238 TPU | — | — | — | 40 | 40 | 40 | 40 | 40 |
| Carboset ® 525 Resin | 100 | — | — | 60 | — | — | — | — |
| Carboset ® 526 Resin | — | 100 | — | — | 60 | — | — | — |
| Carboset ® XL-27 Resin | — | — | — | — | — | 60 | — | 20 |
| Carboset ® XPD 1330 Resin | — | — | 100 | — | — | — | 60 | 40 |

The results of the degradation are shown below in Table 2. Unless otherwise noted, the Degradation Rates are in minutes.

TABLE 2

| Degradation Rate (minutes) | | | | | | | | |
| --- | --- | --- | --- | --- | --- | --- | --- | --- |
|  | Experiment No. | | | | | | | |
|  | 1 | 2 | 3 | 4 | 5 | 6 | 7 | 8 |
| Compression molded | 4.5 | 5 | 3.5 | 4.0 | >20 hrs. | — | 3.5 | — |
| Extruded film | — | — | — | 8 | >>64 hrs. | 7 | 8 | 19 |

Preferably, a blend having an acid number in the range of about 40 to about 105 can be used in the instant invention.

EXAMPLE 2

In this Example, the effect of the acrylic acid copolymer concentration on the degradation rate of a blend formed according to this invention was studied.

For this Example, Estane® 58271 polyurethane available from The B. F.Goodrich Co. was blended with various amounts of the acrylic copolymer as set forth below in Table 3. The blend was formed into compression molded plaques having a thickness of approximately 2.5–3 mils and tested for degradation in an alkaline solution having a pH of 12 and an alkaline solution having a pH of 10.6.

TABLE 3

|  | Experiment No. | | | | | |
| --- | --- | --- | --- | --- | --- | --- |
|  | 9 | 10 | 11 | 12 | 13 | 14 |
| Estane ® 58271 TPU | 0 | 15 | 25 | 35 | 50 | 53 |
| Carboset ® 525 TPU | 100 | 85 | 75 | 60 | 50 | 47 |

The results of the Degradation Rates in minutes are shown below in Table 4.

TABLE 4

| Degradation Rate (minutes) | | | | | | |
| --- | --- | --- | --- | --- | --- | --- |
|  | Experiment No. | | | | | |
|  | 9 | 10 | 11 | 12 | 13 | 14 |
| Solution A (pH = 12) | ? | 1 | 2.5 | 30 | >120 | >72 hrs. |
| Solution B (pH = 10.6) | 5 | 5 | 15 | 50 | 185 | >72 hrs. |

This example shows that as the concentration of the acrylic acid copolymer in the blend of the instant invention increases, the Degradation Rate increases. Moreover, the Degradation Rate increases as the pH of the solution increases.

EXAMPLE 3

In this Example, the effect of the thermoplastic polyurethane chosen for use in the blend was studied. Various thermoplastic polyurethanes commercially available from The B. F.Goodrich Company were blended with two different types of acrylic acid copolymers in the proportions set forth below in Table 5 and blown into films approximately 2.5 to 3.0 mils thick. The blown films were tested for degradation in an alkaline solution having a pH of 10.6.

TABLE 5

|  | Experiment No. | | | | |
| --- | --- | --- | --- | --- | --- |
|  | 15 | 16 | 17 | 18 | 19 |
| Estane ® 58661 TPU | 40 | — | — | — | — |
| Estane ® 58271 TPU | — | 40 | — | — | — |
| Estane ® 58238 TPU | — | — | 40 | — | — |
| Estane ® 58134 TPU | — | — | — | 40 | — |
| Estane ® 58630 TPU | — | — | — | — | 40 |
| Carboset ® 525 Resin | — | 60 | 60 | — | — |
| Carboset ® XPD 1330 Resin | 60 | — | — | 60 | 60 |

The following Degradation Rates in minutes were obtained:

TABLE 6

| Degradation Rate (minutes) | | | | | |
| --- | --- | --- | --- | --- | --- |
|  | Experiment No. | | | | |
|  | 15 | 16 | 17 | 18 | 19 |
| Extruded Films | 5 | >6 hrs. | 6 | 4.5 | >72 hrs. |

From these results, it appears that the type of polyurethane chosen may affect the degradation rate of the blend.

EXAMPLE 4

In this Example, the effect of the melt index of the thermoplastic polyurethane was reviewed. The blends used in this Example were comprised of the materials and their proportions set forth in Table 7.

TABLE 7

|  | Melt Index | Experiment No. | | | | |
|---|---|---|---|---|---|---|
|  | (180° C./7800 g) | 20 | 21 | 22 | 23 | 24 |
| Estane ® 58661 TPU | 0.9 | 40 | — | — | — | — |
|  | 50.2 | — | 40 | — | — | — |
| Estane ® 58238 TPU | 0.8 | — | — | 40 | — | — |
|  | 4.5 | — | — | — | 40 | — |
|  | 22.5 | — | — | — | — | 40 |
| Carboset ® XPD 1330 Resin | 60.6 | 60 | 60 | 60 | 60 | 60 |

The blends were formed into films approximately 3–4 mils thick. These blown films were tested for degradation in an alkaline solution having a pH of 10.6. The degradation rates listed in Table 8 in minutes unless otherwise noted were observed.

TABLE 8

| | Degradation Rate (minutes) | | | | |
|---|---|---|---|---|---|
|  | Experiment No. | | | | |
|  | 20 | 21 | 22 | 23 | 24 |
| Extruded Films | 5 | >16 hrs. | 5 | 8 | >16 hrs. |

From this data, it can be concluded that the Degradation Rate increases as the melt index of the thermoplastic polyurethane decreases. Because the reciprocal of the melt index is a measure of the melt viscosity, it is believed that the different degradation rates must be a result of the different melt viscosities of the thermoplastic polyurethane due to the fact that the melt viscosity of the acrylic acid copolymer was constant.

EXAMPLE 5

In this Example, the effect of the melt viscosity ratios of the polyurethane to acrylic acid copolymer in the blend set forth in Table 9 were studied. Due to the fact that there is a reciprocal dependence of the melt index on the viscosity, the viscosity ratios set forth below were calculated using the reciprocal of the melt indices of the thermoplastic polyurethane and the acrylic acid copolymer incorporated into the blend.

The blends were then blown into film about 3–4 mils thick and tested for degradation in an alkaline solution having a pH of 10.6.

Table 9 sets forth the composition of the blends and their Degradation Rates.

TABLE 9

| | MI (180° C./ 8700 g) | Experiment No. | | | | | | | | | | | | |
|---|---|---|---|---|---|---|---|---|---|---|---|---|---|---|
|  |  | 25 | 26 | 27 | 28 | 29 | 30 | 31 | 32 | 33 | 34 | 35 | 36 | 37 |
| Estane ® 58660 | 10.2 | — | — | — | — | — | — | — | — | — | 40 | — | — | — |
| Estane ® 58661 | 0.9 | — | — | — | 40 | — | — | — | — | — | — | — | — | — |
|  | 50.2 | — | — | — | — | — | — | — | — | — | — | — | 40 | — |
| Estane ® 58238 | 0.8 | — | 40 | 40 | — | — | — | — | — | — | — | 40 | — | — |
|  | 4.5 | 40 | — | — | — | — | — | 40 | — | — | — | — | — | 40 |
|  | 8.0 | — | — | — | — | — | — | — | 40 | — | — | — | — | — |
|  | 22.5 | — | — | — | — | 40 | — | — | — | — | 40 | — | — | — |
|  | 30.2 | — | — | — | — | — | 40 | — | — | — | — | — | — | — |
| Carboset ® XPD 1330 | 60.8 | — | 60 | — | 60 | — | — | — | 60 | 60 | 60 | — | 60 | — |
| Carboset ® 525 | 58.6 | — | — | 60 | — | — | — | 60 | — | — | — | — | — | — |
| Carboset ® 526 | 1.4 | — | — | — | — | — | — | — | — | — | — | 60 | — | 60 |
| Carboset ® XL-27 | 480.0 | 60 | — | — | — | 60 | 60 | — | — | — | — | — | — | — |
| TPU/Acrylic Acid Copolymer viscosity ratio |  | 106.7 | 75 | 72.0 | 57.5 | 21.3 | 15.8 | 12.9 | 7.6 | 6.0 | 2.7 | 1.75 | 1.04 | 0.3 |
| Degradation Rate - (mins.) at pH = 10.6 (3–4 mil film) | | | | | | | | | | | | | | |
| blown film |  | 7 | 5 | 4 | 5 | 8 | 12 | 8 | 25 | 32 | >16 hrs | >20 hrs | >16 hrs | >64 hrs |
| compression molded |  | 4 |  | 2 |  | 3 | 14 | 4 |  |  | >16 hrs | >20 hrs | >34 hrs | >72 hrs |

From the data in Table 9, it is evident that blends having a high viscosity ratio exhibit a superior degradation rate as compared to low viscosity ratio blends.

EXAMPLE 6

In this example, the percentage drop in tensile strength as a function of the immersion time of the blend in a solution having a pH of 10.6 was studied. Three blends using Estane® 58238 polyurethane and Carboset® XPD 1330 having different viscosity ratios set forth below in Table 10 below were used.

TABLE 10

|  | Viscosity Ratio | | |
|---|---|---|---|
|  | 72 | 12.7 | 2.7 |
| Immersion Time (min.) | | | |
| 2 | 97% | 41% | — |
| 5 | 100% | 97% | — |

TABLE 10-continued

| | Viscosity Ratio | | |
|---|---|---|---|
| | 72 | 12.7 | 2.7 |
| 15 | | 100% | 0 |
| 30 | | | 35% |
| 120 | | | * |
| 17 days | | | |
| 29 days | | | |
| Initial Tensile Strength (psi) | 3150 | 3400 | 3400 |

*The sample swelled and could not be tested.

The results from this example show the higher the viscosity ratio, the faster the degradation rate of the blend.

Although specific embodiments and examples have been disclosed herein, it should be borne in mind that these have been provided by way of explanation and illustration and the present inventor is not limited thereby. Certainly, modifications which are within the ordinary skill in the art are considered to lie within the scope of the invention as defined by the following claims and all equivalents.

We claim:

1. A water degradable composition comprising melt a blend of a thermoplastic polyurethane and acrylic acid copolymer wherein said thermoplastic polyurethane forms the discontinuous phase of the blend and said acrylic acid copolymer forms a continuous phase.

2. A composition as claimed in claim 1, wherein the acrylic acid copolymer has a weight average molecular weight in the range of about 100,000 to about 300,000, and at least four weight percent carboxyl functionality based on the weight of said acrylic acid copolymer.

3. A composition as claimed in claim 1 wherein the thermoplastic polyurethane has a weight average molecular weight in the range of about 150,000 to about 400,000.

4. A composition as claimed in claim 1 wherein the amount of the thermoplastic polyurethane is from about 5 to about 46 weight percent of said blend.

5. A composition as claimed in claim 1, wherein the amount of acrylic acid copolymer is from about 54 to about 95 weight percent of said blend.

6. A composition as claimed in claim 1, wherein said acrylic acid copolymer has a weight average molecular in the range of 100,000 to about 300,000 and at least 4 weight percent carboxyl functionality based upon the weight of said acrylic acid copolymer, and wherein said thermoplastic polyurethane has a weight average molecular weight in the range of about 150,000 to about 400,000.

7. A composition as claimed in claim 1, wherein said blend comprises from about 20 to about 46 weight percent of thermoplastic polyurethane and from about 80 to about 54 weight percent of said acrylic acid copolymer based upon the weight of said blend.

8. A composition as claimed in claim 1, wherein said blend comprises from about 10 to about 40 weight percent of said thermoplastic polyurethane and from about 90 to about 60 weight percent of said acrylic acid copolymer based upon the weight of said blend.

9. A composition as claimed in claim 1, wherein said composition further comprises optional additive(s) and lubricant(s).

10. A degradable composition consisting essentially of a blend of about 10 to about 40 weight percent of a thermoplastic polyurethane and from about 90 to 60 weight percent acrylic acid copolymer having at least 4 weight percent carboxyl functionality, said carboxyl functionality being based upon the weight of said acrylic copolymer, and optionally including lubricant(s), additive(s) and compatibilizer(s).

11. A personal care product formed from a water degradable composition comprising a melt blend of a thermoplastic polyurethane and an acrylic acid copolymer, said acrylic acid copolymer having a weight average molecular weight from about 100,000 to about 300,000 and wherein the thermoplastic polyurethane forms the discontinuous phase of the blend.

12. A packaging product formed from a water degradable composition comprising a melt blend of a thermoplastic polyurethane and an acrylic acid copolymer, said acrylic acid copolymer having a weight average molecular weight from about 100,000 to about 300,000 and wherein the thermoplastic polyurethane forms the discontinuous phase of the blend.

13. A composition as claimed in claim 8, wherein said acrylic acid copolymer has at least four weight percent carboxyl functionality based upon the weight of the acrylic acid copolymer and has a weight average molecular weight in the range from about 100,000 to about 300,000.

14. A composition as claimed in claim 13, wherein said thermoplastic polyurethane has a weight average molecular weight in the range of about 150,000 to about 400,000.

15. A composition as claimed in claim 14, wherein said polyurethane is the reaction product of at least a non-hindered aromatic diisocyanate and a linear hydroxyl terminated polyester having a number average molecular weight of from about 700 to about 5,000.

16. A composition as claimed in claim 15, wherein said polyester is formed from aliphatic dicarboxylic acids having from 4 to 15 carbon atoms and aliphatic glycols having from 2 to 12 carbon atoms.

17. A composition as claimed in claim 16, wherein said polyurethane is the reaction product of a non-hindered aromatic diisocyanate, an aliphatic glycol chain extender, and a linear hydroxyl terminated polyester having a number average molecular weight of from about 700 to about 5,000.

18. A composition as claimed in claim 4, wherein the composition loses integrity and disintegrates into small particle after 60 minutes in an alkali solution.

19. A composition as claimed in claim 14, wherein the dispersed polyurethane phase has a particle size from about 0.25 micrometer to about 15.0 micrometer.

20. A composition as claimed in claim 14, wherein the dispersed polyurethane phase has a lamellar thickness of from about 0.1 to 0.5 micrometers.

* * * * *

UNITED STATES PATENT AND TRADEMARK OFFICE
CERTIFICATE OF CORRECTION

PATENT NO. : 5,859,151
DATED      : January 12, 1999
INVENTOR(S) : Yona Eckstein et al.

It is certified that error appears in the above-identified patent and that said Letters Patent is hereby corrected as shown below:

On title page, item

[75] Inventors:", please change the spelling of the third inventor's first name to --Witold--.

Signed and Sealed this

Seventh Day of September, 1999

Attest:

Q. TODD DICKINSON

*Attesting Officer*     *Acting Commissioner of Patents and Trademarks*